A. C. Jones,
Pipe Coupling,

No. 32,135.  Patented Apr. 23, 1861.

Witnesses.
E. Howson
Charles Howson

Inventor.
A. C. Jones.
Henry Howson
Atty

UNITED STATES PATENT OFFICE.

ALFRED C. JONES, OF PHILADELPHIA, PENNSYLVANIA.

PIPE-JOINT.

Specification of Letters Patent No. 32,135, dated April 23, 1861.

*To all whom it may concern:*

Be it known that I, A. C. JONES, of Philadelphia, Pennsylvania, have invented a new and useful Improvement in Pipe-Couplings; and I do hereby declare the following to be a full, clear, and exact description of the same, reference being had to the accompanying drawing and to the letters of reference marked thereon.

My invention consists of a packing ring of flexible material formed substantially as described hereafter and interposed between the ends of two pipes so formed in respect to the said ring that the latter shall form a self packing and yielding joint.

In order to enable others to make and use my invention, I will now proceed to describe its construction and operation.

Figure 1:
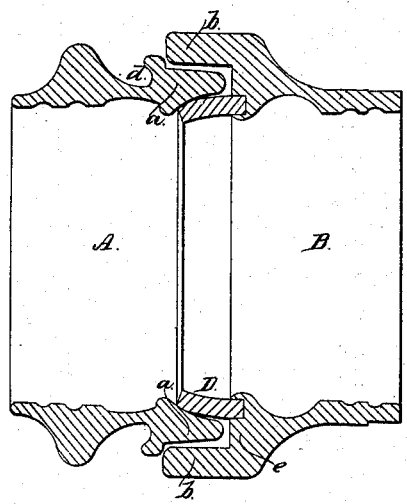
Figure 2:
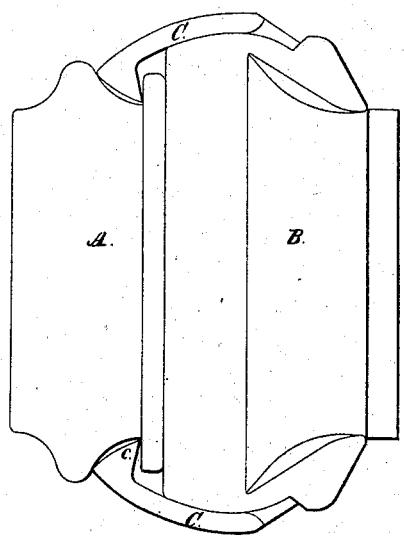
Figure 3:
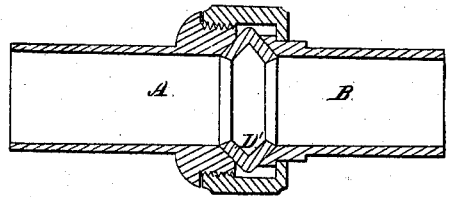
Figure 4:
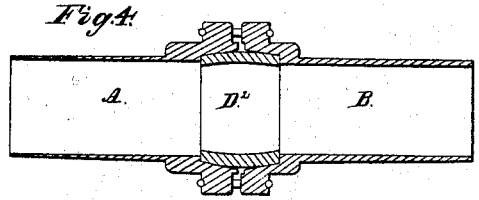

On reference to the accompanying drawing which forms a part of this specification Figure 1 is a sectional view of a hose coupling with my improved packing; Fig. 2 an exterior view of Fig. 1; Fig. 3 a sectional view of a pipe coupling with a modification of my improved packing; Fig. 4 a pipe coupling showing another modification of my improvement, and Fig. 5 an exterior view of Fig. 4.

In reference to Figs. 1 and 2, A and B represent the two halves of the coupling, the latter half having an annular flange $b$ into which an annular projection $a$ of the half A fits freely. The interior of this flange $a$ is beveled as seen in the sectional view Fig. 1 for a purpose which will be rendered apparent hereafter. The two halves of the coupling are held together by two spring dogs C, C, which are hinged to the half B and which have angular projections $c$ arranged to catch into an annular recess $d$ of the half A of the coupling.

As my improvement does not depend upon any particular device for fastening the two halves of the coupling together, and as the devices illustrated will form the subject of a separate application for a patent it will suffice to observe that the two halves need not be brought into forcible contact with each other in order to form a perfectly tight joint, the connection being a comparatively loose one and allowing for the ready detachment of the two halves from and attachment to each other.

The hose of leather or other suitable material may be attached to the two halves of the coupling in the usual manner.

Near the edge of the shoulder $e$ formed within the annular flange $b$ of the half B of the coupling is cut an annular recess for the reception of one edge of the packing ring D which may be made of gum elastic leather or other suitable flexible material. This ring is forced into the recess so tightly, and may be otherwise so secured as to form a permanent part of the half B of the coupling until removal therefrom becomes necessary. The opposite edge of the packing ring D bears against the beveled interior of the annular projection $a$ of the coupling, which, when the two halves of the latter are connected together, tends to bend the packing ring to the form represented in the sectional view Fig. 1.

It will be evident without further description that although the two halves of the coupling are loosely connected together a perfectly tight joint will be formed by the packing ring combined with the beveled or inclined interior of the flange $a$, as long as the flow of water is continued through the coupling, and that the greater the internal pressure, the tighter will be the joint, in other words that the ring and beveled interior of the projection $a$ render the coupling self-packing.

Figure 5:
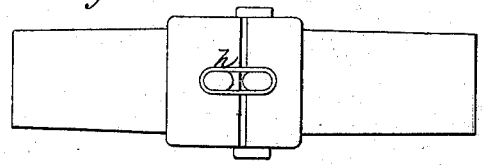

In reference to Fig. 3 A and B represent the ends of two pipes connected together by an ordinary screw coupling which is too well understood to need description here. The ends of both pipes are beveled to correspond to the inclined sides of the V formed packing ring D' which is interposed between the ends of the pipes and which together with the beveled ends of the latter forms a self-packing joint. This modification of my improvement is especially applicable to the formation of joints for steam and hot water pipes which are liable to expand and contract, the interposition of the V formed flexible ring, which in this case should be made of vulcanized gum elastic, allowing for a limited movement of the pipes from and toward each other without in any way interfering with the self-packing properties of the ring. In Figs. 4 and 5 the ends of the two pipes A and B are connected together by two simple links $h$ $h$ which are passed over lugs on the adjacent ends of the pipes, the said lugs having recesses for the reception and retention of the links. The end of each pipe has a beveled recess, the recess of one pipe receiving one half and that of the other pipe receiving the other half of the packing ring $D^2$, which, when the pipes are connected together, will assume the bent form represented in the sectional view Fig. 2. It will be evident without further explanation that the ring $d^2$ forms with the beveled recesses a self packing joint equally as efficient as those above described, and capable of yielding without its efficiency being disturbed. It will also be evident that in regard to simplicity cheapness and general applicability the above described self packing joints are superior to the rigid connections usually resorted to in coupling pipes together, especially as they admit of a slight longitudinal as well as lateral movement of the pipes.

I claim as my invention and desire to secure by Letters Patent—

A packing ring of flexible material formed substantially as described and interposed between the ends of two pipes so formed in respect to the ring that the latter shall form a self-packing and yielding joint as herein set forth.

In testimony whereof, I have signed my name to this specification, in the presence of two subscribing witnesses.

ALFRED C. JONES.

Witnesses:
 HENRY HOWSON,
 JOHN WHITE.